UNITED STATES PATENT OFFICE.

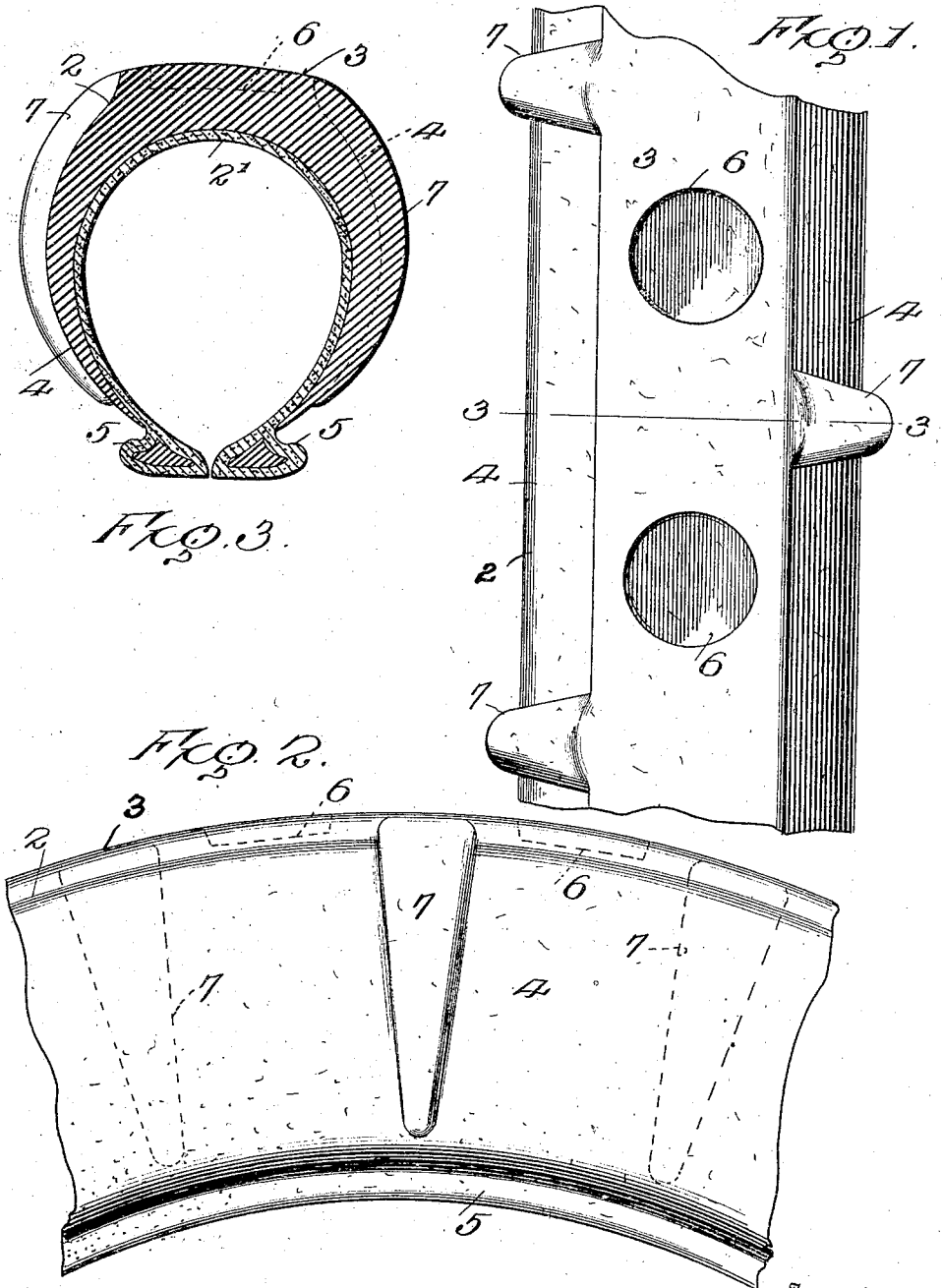

IVA BELLE KEMPSHALL, OF BOSTON, MASSACHUSETTS, ASSIGNOR TO KEMPSHALL TIRE COMPANY, A CORPORATION OF MAINE.

TIRE.

957,167.  Specification of Letters Patent.  Patented May 3, 1910.

Original application filed March 21, 1910, Serial No. 550,562. Divided and this application filed April 2, 1910. Serial No. 553,121.

*To all whom it may concern:*

Be it known that I, IVA BELLE KEMPSHALL, a citizen of the United States, residing at Boston, in the county of Suffolk and State of Massachusetts, have invented certain new and useful Improvements in Tires; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to improvements in vehicle tires, and forms a division of my application for Patent No. 550,562, filed March 21, 1910.

The invention relates more particularly to the shoe or tread portion, the object being to so dispose a series of projections or ribs, with reference to a plurality of pockets or compression chambers in the face of the tread, that the effective action of the said chambers will not be interfered with by the projections.

It is essential in tires having compression chambers in the tread, to permit the material of the tire surrounding such chambers to readily yield to allow the suction action to freely take place, and yet it is equally essential that the thickened tread surface be reinforced to prevent the tire cracking or breaking on the line where it flexes when load pressure is applied. This contingency must be met according to the weight, and size of the tire and the use to which the latter is to be put. For light and medium weight tires, I have found that if the projections are alternately disposed on opposite sides of a tire and each projection is alternately disposed with reference to a compression chamber the suction action of the said chambers will be effective, and the intermediate portion of the tread surface between the compression chambers will be adequately braced to prevent the tread cracking and breaking and yet permit of the required resiliency. Furthermore, to render the projections more effective when the load strain is applied to the tire the outer ends of the projections terminate with and their surfaces are level with the tread surface, of the tire. By this construction the pressure is in direct line with the projections, and thereby relieves the strain on the surface between such projections.

The invention also relates to the specific details of construction and arrangement of parts to be hereinafter described, and particularly pointed out in the claims.

In the drawing: Figure 1 is a plan view of my improved tire. Fig. 2 is a side elevation of the same. Fig. 3 is a cross section on the line 3—3 of Fig. 1.

The same numerals refer to like parts in all the figures.

In the preferred form thereof shown herein, the shoe when the tire is of pneumatic form, or the wear member thereof when the tire is of solid form, may be made of any preferred construction, the surface of which, however, is usually composed of rubber. In the present instance this wear member or shoe 2 is shown provided with a tread 2' the tread surface 3 of which is slightly curved in cross section, although it may be entirely flat if preferred. This tread surface is somewhat thickened as compared with the sides of the tire, the sides 4 of such tire tapering in thickness away from the tread and toward the beaded or flanged edges 5 formed for the purpose of attaching the shoe to the rim or felly. In the present instance this wear member or shoe 2 is provided along its tread surface or periphery with a series of openings or chambers 6, preferably of circular formation and forming suction or compression pockets. These openings extend around the entire surface of the tire and, as stated, form compression chambers effective to grip the road surface and prevent skidding.

The sides of the tire are reinforced by the provision of ribs or projections 7 which in the present instance terminate at the tread surface or periphery of the tire, and as shown herein the ends thereof are slightly beveled or rounded and are level with the slightly curved periphery of the tread. When the tread surface, however, is entirely flat these ribs may also terminate in flat surfaces and of course will be level with the tread. Thus it will be observed that in the present improvement the outer ends of the buttresses conform to the tread surface of the shoe and terminate at such tread surface, so that when the tire is under load the outer ends of the projections, as well as the tread surface, will be brought into engagement with the roadway, so that the projections will receive a portion of the load of the tire and thus reinforce the tapering side portions of the tire in a manner which will be readily understood. These projections taper off toward their inner ends, where they merge into the side portions of the tire near the bead or flange thereof, their thickened or enlarged ends being adjacent to and terminating at the tread surface of the tire, thus greatly strengthening the sides of the tire while such thickened ends reinforce the tread surface, such ribs distributing the stress of pressure from the thick tread to the thinner sides in substantial proportion to the tapered portion of the side walls of the tire, thus obviating any tendency of the shoe or tire to break down, and this without interfering with the proper resiliency of the different portions of the tire. The ribs or projections are not only located alternately with the suction chambers, but alternately relatively to each other at the sides of the tire, as clearly shown in the drawings.

When the chambers and projections are located as shown and described, the chambers will more readily adhere to the roadway, while at the same time the ribs are so disposed as to provide a substantial brace to the intermediate portions of the tire, and materially assist in preventing the same crushing or cracking when the load strain is applied.

What I claim is:

1. An anti-skidding tire for motor vehicles, having a tread portion provided with a series of chambers, or pockets, the tread portion having at the sides thereof a series of projections terminating at the tread and level therewith, said chambers being located alternately with the projections at the sides of the tire and said projections being also alternately located.

2. An anti-skidding tire for motor vehicles, having a tread portion provided with a series of chambers or pockets, the tread portion having at the sides thereof a series of projections terminating at the tread and level therewith, there being one of the projections on one side of the tire between two compression chambers or pockets, and there being one of the projections on the opposite side of the tire between one of the before mentioned compression chambers or pockets and the next succeeding compression chamber or pocket, and the sides of the tire opposite to where the projections are located being free of the projections.

In testimony whereof I have signed my name to this specification in the presence of two subscribing witnesses.

IVA BELLE KEMPSHALL.

Witnesses:
JNO. IMIRIE,
PAUL B. BRACKETT.